P. PEARTREE.
Machines for Driving Brush-Handles.

No. 138,344. Patented April 29, 1873.

Witnesses:
A. W. Almquist
C. Sedgwick

Inventor:
P. Peartree
per
Attorneys.

UNITED STATES PATENT OFFICE.

PETER PEARTREE, OF LANSINGBURG, NEW YORK, ASSIGNOR TO JOHN AMES, OF SAME PLACE.

IMPROVEMENT IN MACHINES FOR DRIVING BRUSH-HANDLES.

Specification forming part of Letters Patent No. 138,344, dated April 29, 1873; application filed October 12, 1872.

*To all whom it may concern:*

Figure 1:
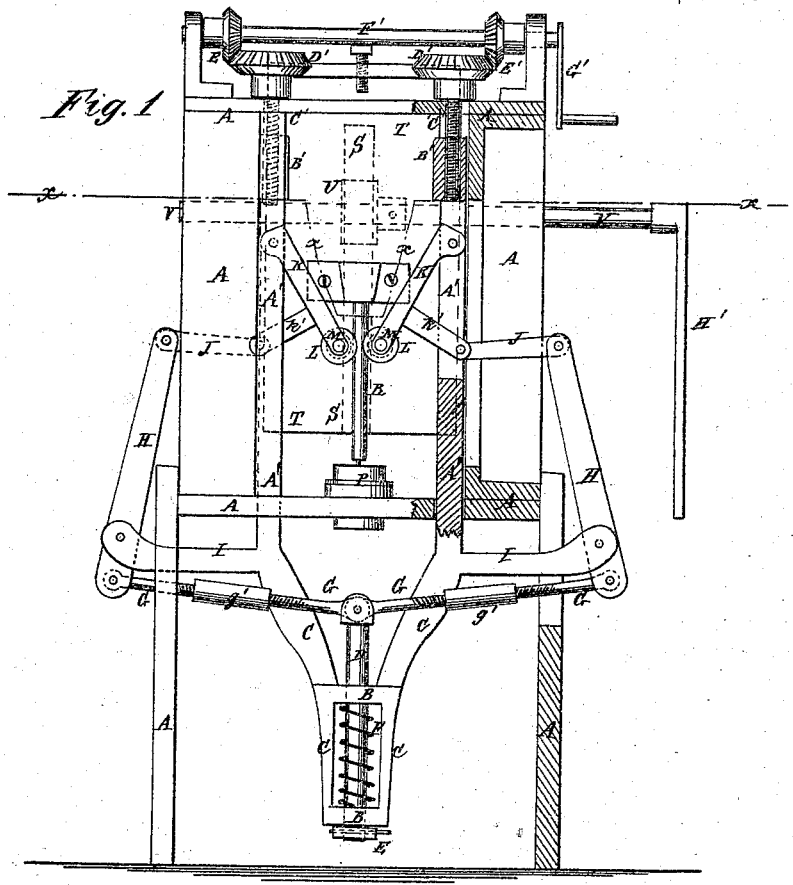
Figure 2:
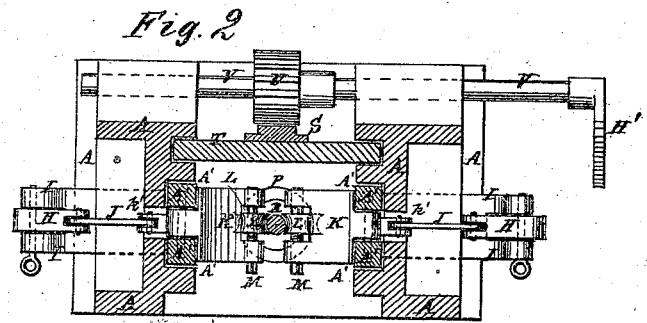
Figure 3:
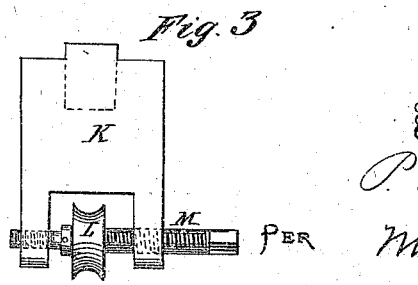

Be it known that I, PETER PEARTREE, of Lansingburg, in the county of Rensselaer and State of New York, have invented a new and useful Improvement in Machine for Driving Brush-Handles, of which the following is a specification:

Figure 1 is a front view of my improved machine, partly in section, to show the construction. Fig. 2 is a detail horizontal section of the same taken through the line $x\,x$, Fig. 1. Fig. 3 is a detail view of one of the pivoted arms and adjustable guide-rollers.

Similar letters of reference indicate corresponding parts.

My invention has for its object to improve the construction of the machine for driving brush-handles for which Letters Patent No. 129,748 were granted to John Ames (Peter Peartree, inventor,) July 23, 1872, so as to make it more convenient in use and effective in operation; and it consists in the combination of the guides, arms, or frame, vertical rod provided at its lower end with a foot-rest or treadle, a coiled or equivalent spring, extension bars, levers, arms, connecting-bars, branched arms, guide-wheels, pivoting and adjusting screw-pins, and the slides with each other and with the frame-work of the machine; in the combination of the shaft, gear-wheel, toothed rack, and driver with the adjustable handle-holders and the frame-work of the machine for driving the brush-handles; and in the pivoted arms, adjustable grooved wheels, and adjusting screw-pin for centering the brush-handles, as hereinafter more fully described.

A is the frame-work of the machine. B are two guide-plates, which are firmly connected by the arms or frame C with each other and with the slides A'. Through the plates B are formed holes for the passage of the vertical rod D, to the lower end of which is attached or upon it is formed a foot-rest or treadle, E. The rod D is held up by a coiled or other spring, F, coiled around or connected with said rod D. To the upper end of the vertical rod D are pivoted the inner ends of two bars, G, which pass out through openings or slots in the frame A, and to their outer ends are pivoted the lower ends of the two levers H. The two rods or bars G are each made in two pieces, the adjacent ends of said pieces being connected by a right-and-left nut $g$, as shown in Fig. 1, so that by turning said nuts in one or the other direction the said rods or bars may be lengthened, as may be desired. This adjustment gives great facility for centering the brush-handles, as hereinafter described. The levers H are pivoted to lugs or brackets I, attached to or formed upon the sides A' or arms C at or near their points of intersection, as shown in Fig. 1. To the upper ends of the levers H are pivoted the outer ends of the short bars J, which pass through slots in the slides A', and their inner ends are pivoted to the outer ends of the arms K', formed upon or rigidly attached to the arms K. The upper ends of the arms K are pivoted to the upper parts of the slides A', so that the lower or free ends of the arms K may be moved in and out by the movements of the levers H. The lower or free ends of the arms K are notched or slotted to receive the small grooved wheels or pulleys L, which are made thinner than the width of the slots or notches in the ends of the arms K, in which they are placed. The pulleys L run loosely upon the pins M, upon which they are secured in place by collars or pins. The pins M have screw-threads cut upon one or both their end parts to fit into screw-threads cut in the notches or slotted ends of the arms K, through holes in which the said pins or screws M are inserted, so that the said pulleys or wheels L may be adjusted laterally by turning the pins or screws M in one or the other direction. To the upper ends of the slides A' are attached, or upon them are formed, stationary nuts B', through which pass the screws C', which are swiveled to the upper part of the frame-work A, and to the upper ends of which are attached bevel-gear wheels B, into the teeth of which mesh the teeth of the bevel-gear wheels E', attached to the shaft F'. The shaft F' revolves in bearings attached to the upper part of the frame A, and to one of its ends is attached a crank, G'. By this construction, by operating the crank G' the guide-slides A' may be raised and lowered to adjust the guide-wheels L to the size of the brush to be operated upon. By this construction, as the slides A' are moved up and down they carry all the arms, rods, levers, guides, &c., with them, so that said parts are always kept in the said relative position with respect to each other so as to require no adjustment of their pivoting-points. The butt of the brush-head, while being operated upon, rests upon a die or plate, P, having a hole formed through its center for the passage of the brush-handle. The stem or shank of the die P fits into a hole in the bed-plate or table of the machine, where it may be secured in place by a set-screw or other convenient means. In the case of filled brush-heads the die P must be made with a central ring-projection, as shown in Fig. 1, to fit into the open end of the brush-ferrule, so that the ends of the bristles may have a firm support while the handle is being driven. In the case of solid brush-heads the die P should be made with a shallow socket or recess to receive the butt of the brush-head, so that it may be held securely and steadily while the handle is being driven. The handle is driven by the plunger or driver R, upon the lower end of which is formed, or to it are attached, one or more spurs to penetrate the end of the brush-handle, and thus keep it in place. In the case of round handles one spur would be sufficient; but in the case of oval handles there should be two or more spurs to keep the said handle from turning upon the guide-wheels L. The upper end of the plunger or driver R is attached, by means of a block projection or bracket, to the forward side of the plate or frame T, the side edges of which enter grooves in the side parts of the upper part of the frame A. To the rear side of the sliding plate or frame T is attached a toothed rack, S, into the teeth of which mesh the teeth of the gear-wheel U, attached to the shaft V, which revolves in bearings attached to the frame A, and to which power is applied by means of a lever, H', or other convenient means. By this construction, when the brush-handle and brush-head have been arranged in place as hereinbefore described, by moving the lever H' in one direction the handle will be forced down into the brush-head, and by moving said handle in the other direction the driver R will be raised to receive another handle. W is a set-screw, which passes down through a lug, flange, or arm attached to the forward side of the upper end of the plate or frame T, so that as the said plate or frame is lowered to drive the brush-handles the forward end of the said set-screw may strike against the top bar or plate of the frame A, and stop the driver at the required point. This construction enables the operator, by simply adjusting the set-screw W, to drive all the handles to exactly the same point, which, when the handles are driven by hand, is almost impossible to be done.

Having thus described my invention, I claim as new and desire to secure by Letters Patent—

1. The combination of the guides B, arms or frame C, vertical rod D provided at its lower end with a foot-rest or treadle, E, coiled or equivalent spring F, extension bars G g', levers H, arms I, short bars J, arms K k', guide-wheels L, pivoting and adjusting screw-pins M, and slides A' with each other and with the frame A, substantially as herein shown and described.

2. The combination of the shaft V, gear-wheel U, toothed rack S T, and driver R with the adjustable holders K L M and frame A for driving the brush-handle, substantially as herein shown and described.

3. In a machine for driving brush-handles, the pivoted arms K, adjustable grooved wheels L, and adjusting-screw pins M for centering the brush-handles, substantially as herein shown and described.

PETER PEARTREE.

Witnesses:
M. L. FANCHER,
CHARLES LANSING.